United States Patent

[11] 3,559,785

[72] Inventor Thomas J. Weir
 Indianapolis, Ind.
[21] Appl. No. 803,157
[22] Filed Feb. 28, 1969
[45] Patented Feb. 2, 1971
[73] Assignee Wallace-Murray Corporation
 New York, N.Y.
 a corporation of Delaware

[54] VARIABLE FLUID COUPLING
 6 Claims, 4 Drawing Figs.
[52] U.S. Cl. ................................................ 192/58,
 192/82
[51] Int. Cl. ........................................... F16d 31/06,
 F16d 31/08
[50] Field of Search ........................................ 192/58,
 58(A1), 58(A2), 58(A3), 82, 70

[56] References Cited
 UNITED STATES PATENTS
 3,007,560 11/1961 Weir .......................... 192/58(A2)
 3,262,528 7/1966 Weir .......................... 192/58(A2)
 3,430,743 3/1969 Fujita et al. .................. 192/58(A2)

Primary Examiner—Allan D. Herrnamm
Attorney—Herman Foster

ABSTRACT: A temperature responsive fluid coupling. The driven member is a housing adapted to carry a cooling fan for an internal combustion engine. The driving member is a disc having a storage chamber for friction fluid opening on one side of it. Grooves on the sides and periphery of the disc cause the friction fluid to continuously flow from one to the other side of the disc and through it. A temperature responsive element acting as a valve varies the quantity of fluid passing between a drive chamber and storage area.

INVENTOR.
THOMAS J. WEIR
BY Herman Foster
ATTORNEY

VARIABLE FLUID COUPLING

This invention relates to a temperature responsive fluid coupling of the type wherein the degree of coupling between the driving and the driven elements is dependent upon ambient temperature. Fluid couplings are used and have for long times past been used in a great variety of mechanical applications. For example, a fluid coupling is used when smooth power transmission is one requirement of a prime mover. This is usually achieved by utilizing the shear properties of a contained fluid and is an inherent property of most fluid couplings and accordingly such devices have enjoyed wide acceptance and popularity in a variety of applications.

One such field of application is the area of automobile cooling systems. In an internal combustion engine of the type commonly employed in automobiles, it is necessary to cool the engine in order to maintain it below a certain maximum temperature. This is generally done by forming a series of passageways through the engine block and pumping waterbase fluids through these passageways, the water serving to carry heat from the engine to a radiator where it is transferred to the atmosphere by radiation and convection. It has long been known in the automotive industry that the cooling requirement for an internal combustion engine by artificial means such as a fan decreases with lower ambient temperatures. For example, very little forced removal of heat would be required on an extremely cold day. On the other hand, as the ambient temperature increases, heat loss by natural radiation and convection from the engine to the atmosphere decreases, all in accordance to well known heat transfer laws from the science of thermodynamics.

In general, the present invention relates to a fluid coupling wherein one of the portions of the coupling, the driven portion, is adapted to carry a fan. The driving portion is adapted to be coupled to the internal combustion engine and the fan placed adjacent the radiator of the cooling system. Whenever the ambient or outside temperature is relatively low, the cooling requirements of the engine are correspondingly low and the degree of fluid coupling between the fan and the engine is relatively low. This means that as the engine turns, the fan is not constrained to revolve at the same rate because of the low degree of coupling. In turn the fan requires relatively little energy to rotate, it being remembered that energy is required to rotate the curved or angularly displaced fan blades against the air, with the engine supplying this necessary force or energy. The faster the fan blade turns, the more power is required. As a by product, increased noise normally results from the faster turning fan blade. As the ambient or external temperature increases, the requirement for forced cooling increases. In such a situation, it is necessary that the fan rotate faster, thereby increasing the forced draft of air against the radiator. In this manner, compensation is made for the decrease in temperature differential between the engine and the ambient temperature.

Examples of such fluid couplings for this purpose may be seen a drive Pat. Nos. 3,007,560 issued Nov. 7, 1961 and 3,262,528 issued July 26, 1966. Yet another example of a prior art structure of this type is to be found in British Pat. 863,532 of March 22, 1961. According to the prior art as typified by the last mentioned U.S. patent, a bimetal which undergoes an appreciable movement upon changes in its ambient temperature functions to vary the amount of a coupling fluid, such as a silicone fluid, in A DRIVE chamber. In general the greater the amount of coupling fluid in such a chamber the greater will be the degree of coupling because of the greater shear surface of the coupling fluid, and hence the greater will be the torque or force transmitted from the engine to the fan. The subject invention employs the same general mode of operation, yet employs a novel configuration or geometry which is simpler and less expensive to fabricate in order to produce the same end result.

According to the practice of this invention, a disc is positioned within a housing, with the disc being provided with radially-outwardly extending grooves or channels on the outer portions of its faces and a spiral groove on its periphery. An aperture is provided to define a passageway through the disc, between its two faces. One face of the disc is provided with a storage chamber and the other face of the disc is provided with a bimetal element adapted to move in response to a change in ambient temperature as sensed by the element. The position of the element relative to the disc which carries it determines the amount of the friction fluid in a drive chamber. According to the practice of this invention, it is not necessary to form a separate or distinct retaining wall in order to provide a storage cavity for the drive fluid, for it is a feature of the invention to employ radially outwardly extending grooves on both faces of a driven disc in cooperation with a spiral groove on the periphery of the disc to impose the retention force on fluid in the storage cavity and further to more positively promote continuous circulation of drive fluid. In the drawings, FIG. 1 is a cross-sectional view illustrating a fluid coupling according to this invention.

Figure 3:
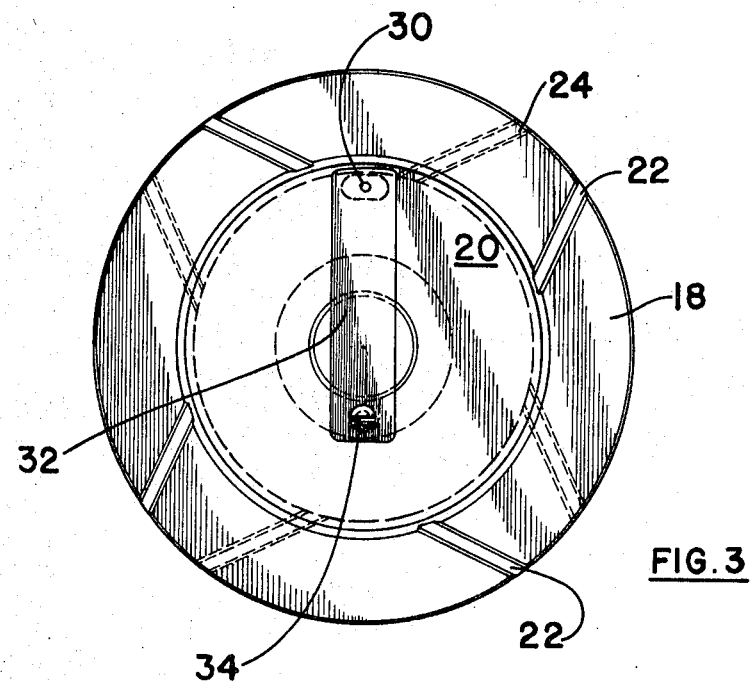
FIG. 3 is a view taken along section 3—3 of FIG. 1.

Referring now to the drawings, the numeral 10 denotes in general the temperature response fluid coupling of this invention and includes a driving shaft 12. Shaft 12 may be provided with an annular flange 14 adapted to be coupled to a power source such as an automobile engine (more particularly, the water pump shaft) and is further provided with a recess 16 which serves as a pilot hole to facilitate such mounting. The numeral 18 denotes a disc shrink fitted to the shaft 12 or said disc may be coupled to the shaft as by a key or by any other convenient means. The disc has two faces referred to as front face 17 and back face 19. The numeral 20 denotes an annular, continuous chamber in the back face 19 of disc 18 and it will be observed that this chamber may be either cast or machined from the metal. The numerals 22 denote any one of a plurality of generally outwardly extending chordal grooves in the face 17 of the disc 18. The numeral 24 denotes similar outwardly extending chordal grooves, shown in FIG. 3 in dashed lines, which are in the face 19 of the disc 18.

Figures 1, 2:
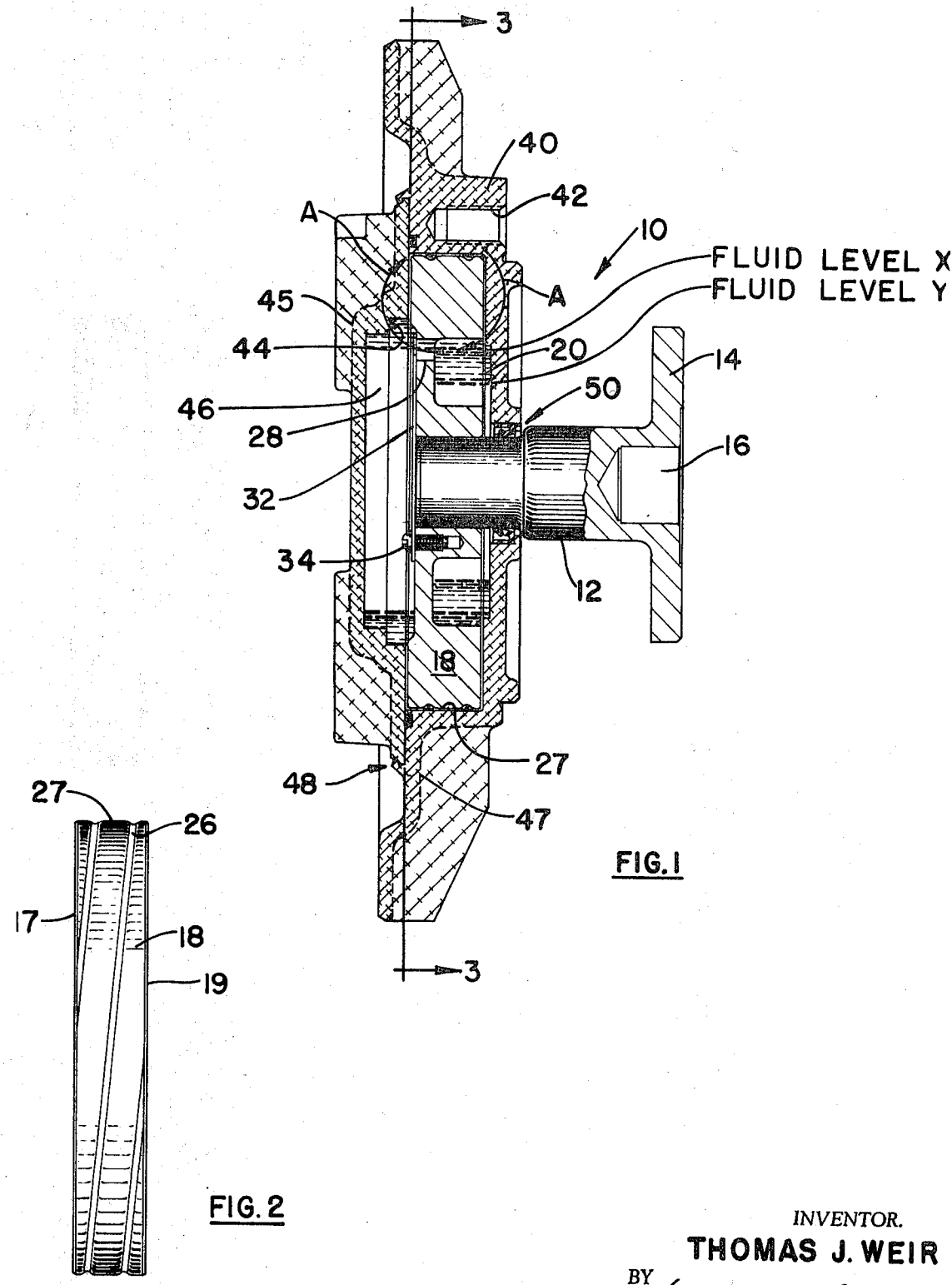
FIG. 2 is a side view of the driving disc of FIG. 1.
Figure 4:
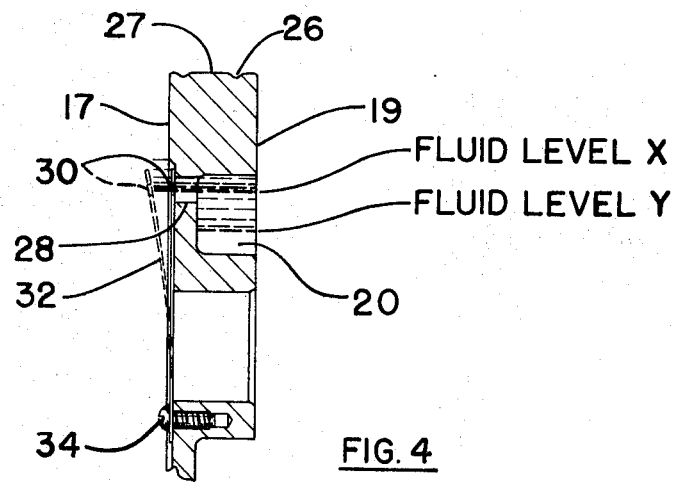
FIG. 4 is a cross-sectional view of the driving disc of FIG. 1 showing the action of the bimetal element.

As shown in FIG. 2 and partially in FIG. 4, the numeral 26 denotes a continuous spiral groove formed in the periphery 27 of the disc, the spiral groove extending from one face of the disc to the other. The numeral 28 denotes an aperture or port extending from the chamber 20 completely through to the face 17 of the disc. The numeral 32 denotes a bimetallic strip positioned beside port 28. The strip has a through passageway 30 to port 28. The other end of the bimetal is fastened as by a bolt or screw 34 to the face 17 of disc 18.

The numeral 40 denotes generally a housing into which rotatable disc 18 is positioned and may be fashioned as by casting or machining. The housing may include one or more apertures 42 for the reception of fastening means for a fan. The numeral 44 denotes a countersink in end housing 45. The configuration of the left most (FIG. 1) portion 45 of the housing 40 defines, together with the face 17 of disc 18, a chamber 46 which may be termed a drive chamber. This chamber is adapted to contain a quantity of fluid, as for example a viscous, silicone fluid. The numeral 48 denotes generally a rolled closure for holding the end housing 45 to the right-hand (FIG. 1) portion of the housing which is indicated as 47. Other means of fastening such as screws may also be used to join 45 and 47. Numeral 50 denotes generally a seal. The mode of operation of the device thus far described is as follows.

The entire assembly of FIG. 1 is mounted in an automobile engine with the drive shaft 12 being suitably coupled thereto. As noted above, a fan is attached to the housing 40 as through bolts in apertures 42. Assuming now the highest or hottest ambient temperature, the mode of operation of the coupling is the following. Friction fluid is placed both in chamber 20 and chamber 46. As a result of the hot ambient temperature, bimetal 32 is at its extreme left (FIG. 4) position leaving bore 28 unobstructed. Due to centrifugal force, the fluid in chamber 20 passes outwardly and to the left through the port 28, so that its level will be equalized in both chambers 20 and 46 at the level X indicated in FIGS. 1 and 4. The fluid will be collected in grooves 22 in the face 17 of disc 18, and flow upwardly to the periphery of the disc. This is indicated by the left hand arrow A. At this point, the friction fluid is constrained to pass to the right as viewed in FIG. 1 and FIG. 4 by virtue of the action of spiral groove 26 in the periphery 27. Upon reaching the right hand portion of the periphery 27, the action of grooves 24 in the face 19 of disc 18 compels the fluid to move radially inwardly and back into the storage chamber 20. In the illustrated position of element 32, there will be a maximum amount of friction fluid in chamber 46. The degree of coupling between the drive shaft 12 and the housing 40 will accordingly be a maximum, and the power required to turn the fan will also be a maximum. The circulation of the friction fluid also serves a lubricating and cooling function.

Assume now that temperature conditions change so that the ambient temperature is now much lower than in the first example. Less cooling by the fan is now required and thus power requirements to the fan are lower and it will not be necessary that the degree of coupling be as great. This is automatically accomplished in the following manner. The bimetal member 32 will remain in the closed position against port 28. As a result, flow will occur only to the extent permitted by passageway 30. As this flow is taking place, the above described circulating action, illustrated with two arrows A, is taking place. Because of the pressure imposed by the rotating grooves 26, 22, and 24 a steady state condition will now obtain wherein a certain proportion of the friction fluid which was in the chamber 46 has been transferred by the above described action into the storage chamber 20, and is maintained at a level indicated as Y. A novel feature of this arrangement is that no retaining wall is necessary at the mouth of storage chamber 20 to maintain the level of fluid at Y. Rather, the head imposed by the pumping action of the rotating grooves 26, 22 and 24, is sufficient to hold the liquid in place. Since considerably less fluid is being circulated less shearing action is available and the degree of fluid coupling is now less than before and accordingly the power transmitted to the fan has been decreased. This causes the fan to rotate at a lower speed and has the beneficial side effect of reducing the noise level normally induced by the fan when its full cooling capacity is called for.

With changes in ambient temperature, the element 32 will move between the limits of fully open and fully closed thus controlling the degree of fluid coupling between the drive shaft and the housing 40 in accordance with such temperature changes.

From the preceding description it will be observed that the coupling conserves useful power output of an internal combustion engine. This is achieved by loading the engine with the fan only as ambient temperature conditions dictate, thus increasing the overall efficiency of the power ensemble, and as stated above, providing a quieter environment.

I claim:

1. A temperature responsive fluid coupling including,
    a. a shaft adapted to be driven and carrying a rotatable disc mounted thereon,
    b. a storage chamber within said disc and completely open on a first face of said disc,
    c. a port extending from said storage chamber to a second face of said disc,
    d. an outwardly extending groove in each face of said disc, each groove communicating with the periphery of said disc,
    e. a spiral groove in the periphery of said disc and extending from the first to the second of said disc faces,
    f. a housing enclosing said disc,
    g. a drive chamber defined by a part of said housing and the second disc face, and adapted to be filled with a drive fluid,
    h. means for continually bleeding a fluid from said storage chamber to said drive chamber at a substantially uniform rate, the fluid passing from the drive chamber to the storage chamber through the said grooves, to thereby establish a toroidal circulation,
    i. means responsive to a condition change for controlling the transfer of fluid from said drive to said storage chamber to thereby control the degree of coupling between the housing and the disc.

2. A temperature responsive coupling as called for in claim 1 wherein,
    a. said storage chamber (b) is an open groove in said first face of said disc.

3. A temperature responsive fluid coupling including,
    a. a disc rotatably mounted within a housing and adapted to be externally driven, the housing adapted to carry a fan for cooling an engine,
    b. a storage chamber within said disc and opening completely on a first face thereof,
    c. a drive chamber with said housing and defined by a second face of said disc and a part of the housing,
    d. means for continuously circulating a drive fluid from the storage chamber to the drive chamber at a first rate comprising, outwardly extending grooves on the first and second faces, and a spiral groove on the periphery of said disc, and a passageway between said drive and storage chambers,
    e. means responsive to ambient temperature to vary said rate.

4. The temperature responsive coupling of claim 3 wherein, (a) said storage chamber (b) is an open groove in said first face of said disc.

5. The temperature responsive coupling of claim 3 wherein,
    a. said storage chamber (b) is an open groove in said first face of said disc,
    b. the outwardly extending grooves of said means (d) includes chordal-outwardly extending grooves on the first and second faces, and the spiral groove of said means (d) connects said first and second faces,
    c. said means (e) includes a bimetal strip secured to said disc and positioned to vary said passageway between said storage and drive chambers.

6. The temperature responsive fluid coupling of claim 5 including,
    a. an opening through said strip to thereby establish limited fluid communication between said drive and storage chambers when said passageway is covered.